US010796593B2

(12) United States Patent
Andersen et al.

(10) Patent No.: US 10,796,593 B2
(45) Date of Patent: Oct. 6, 2020

(54) FLIGHT DECK SIMULATION AND TRAINING SYSTEM AND METHOD (71) Applicant: The Boeing Company, Chicago, IL (US)

(72) Inventors: Scott W. Andersen, Redmond, WA (US); Cameron Forrest, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 342 days.

(21) Appl. No.: 15/653,906

(22) Filed: Jul. 19, 2017

(65) Prior Publication Data
US 2019/0027055 A1  Jan. 24, 2019

(51) Int. Cl.
G09B 9/30 (2006.01)
G09B 9/16 (2006.01)
G09B 19/16 (2006.01)
G09B 9/08 (2006.01)

(52) U.S. Cl.
CPC .............. G09B 9/301 (2013.01); G09B 9/08 (2013.01); G09B 9/16 (2013.01); G09B 9/30 (2013.01); G09B 9/308 (2013.01); G09B 19/165 (2013.01); G09B 9/165 (2013.01)

(58) Field of Classification Search
CPC . G09B 9/08; G09B 9/301; G09B 9/16; G09B 9/30; G09B 9/308; G09B 9/165; G09B 19/165; G09B 19/16
See application file for complete search history.

(56) References Cited

U.S. PATENT DOCUMENTS

| 9,546,002 | B1 | 1/2017 | Azcuenaga et al. | |
| 9,583,019 | B1 | 2/2017 | Schwartz et al. | |
| 2003/0211450 | A1* | 11/2003 | Sofia | G09B 7/00 434/350 |
| 2008/0064013 | A1* | 3/2008 | Quimper | G09B 9/30 434/38 |
| 2012/0308965 | A1* | 12/2012 | Andrews | G09B 9/08 434/30 |
| 2014/0134578 | A1 | 5/2014 | Clark et al. | |
| 2016/0012745 | A1* | 1/2016 | Olsen | G09B 13/04 434/227 |
| 2017/0200386 | A1 | 7/2017 | Smith et al. | |

OTHER PUBLICATIONS

European Patent Office Extended Search Report, dated Sep. 18, 2018, regarding Application No. 18181772.7, 9 pages.
Anonymous, "Cockpit Procedures Trainer FJ2000 CPT", Pacific Simulators Brochure 2016, Australia and New Zealand, retrieved Sep. 7, 2018, 6 pages.
Anonymous, "Virtual Avionics Procedures Trainer (VAPT)—Data Sheet", Rockwell Collins, Cedar Rapids Iowa, dated Jul. 7, 2017, 2 pages.
European Patent Office Communication, dated Jun. 3, 2020, regarding Application No. 18181772.7, 7 pages.

* cited by examiner

Primary Examiner — Timothy A Musselman
(74) Attorney, Agent, or Firm — Yee & Associates, P.C.

(57) ABSTRACT

A method and apparatus for training a user of an aircraft. Simulated controls for the aircraft are provided. A training scenario defines actions to be performed by the user with the simulated controls. An action indicator associated with at least one of the simulated controls is displayed based on the training scenario. Actions by the user with the simulated controls are detected. Operation of the aircraft is simulated based on the detected actions by the user with the simulated controls.

20 Claims, 6 Drawing Sheets

FLIGHT DECK SIMULATION AND TRAINING SYSTEM AND METHOD

BACKGROUND INFORMATION

1. Field

The present disclosure relates generally to using simulation of aircraft operation to train aircraft operators and technicians on the operations and functioning of an aircraft. More particularly, the present disclosure relates to a method and apparatus that uses an interactive simulated flight deck for an aircraft to provide improved feedback for training aircraft operators and technicians regarding the operation and functions of an aircraft.

2. Background

Traditional training of personnel to operate aircraft may include computer-based training. Such training is two-dimensional and may be self-run by the person being trained.

Traditional training solutions may use simulations of aircraft operation. An aircraft simulation may effectively simulate aircraft operation in response to operator input. However, a conventional aircraft simulation may not understand or distinguish between correct actions and incorrect actions that may be performed by an operator in training or provide useful feedback to a trainee that may be helpful or essential in a training and learning environment. Furthermore, a conventional aircraft simulation may not collect useful data on operator interactions with the simulation that may be used to evaluate the progress of a trainee in learning to operate an aircraft.

Current flight training systems and methods may not be intended to be located within a classroom with other devices. In current training environments, flight training devices may be maintained in separate individual training rooms. In such a set-up, contact and dialogue with others outside of two students and an instructor may be limited.

Therefore, there may be a need for a method and apparatus that take into account at least some of the issues discussed above, as well as other possible issues.

SUMMARY

In one illustrative embodiment, a method of training a user of an aircraft comprises providing simulated controls for the aircraft. An action indicator associated with at least one of the simulated controls is displayed based on a training scenario. The training scenario defines actions to be performed by the user with the simulated controls. Actions by the user with the simulated controls are detected. Operation of the aircraft is simulated based on the detected actions by the user with the simulated controls.

In another illustrative embodiment, an apparatus comprises a simulated flight deck, a training scenario controller, and a simulator. The simulated flight deck comprises simulated controls for an aircraft. The training scenario controller is configured to display an action indicator associated with at least one of the simulated controls based on a training scenario, wherein the training scenario defines actions to be performed by the user with the simulated controls. The simulator is configured to simulate operation of the aircraft based on detected actions by the user with the simulated controls.

In yet another illustrative embodiment, a method of training a user of an aircraft comprises providing simulated controls for the aircraft. A training scenario defining actions to be performed by the user with the simulated controls is selected. A training mode is selected from a plurality of training modes comprising a guided mode, a practice mode, and an evaluation mode. In response to selecting the guided mode, a correct-control-to-operate action indicator is displayed to indicate a correct one of the simulated controls to be operated by the user based on the training scenario. In response to selecting the practice mode, the correct-control-to-operate action indicator is not displayed and an incorrect-control-operated action indicator is displayed to indicate an incorrect one of the simulated controls that was operated by the user based on the training scenario. In response to selecting the evaluation mode, the correct-control-to-operate action indicator and the incorrect-control-operated action indicator are not displayed.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of one or more illustrative embodiments of the present disclosure when read in conjunction with the accompanying drawings, wherein:

DETAILED DESCRIPTION

The illustrative embodiments recognize and take into account different considerations. For example, the illustrative embodiments recognize and take into account that, unlike traditional simulation systems that are designed to simulate aircraft and systems in operation, illustrative embodiments are capable of simulating aircraft and systems operation while at the same time recognizing trainee pilot actions, comparing against specified behavior, and providing immediate feedback to the student.

The illustrative embodiments provide for presenting training content in multiple different training modes, including a guided demonstration mode, a practice mode, and an evaluation mode. Data may be collected during training and saved for future analysis.

Figure 1:
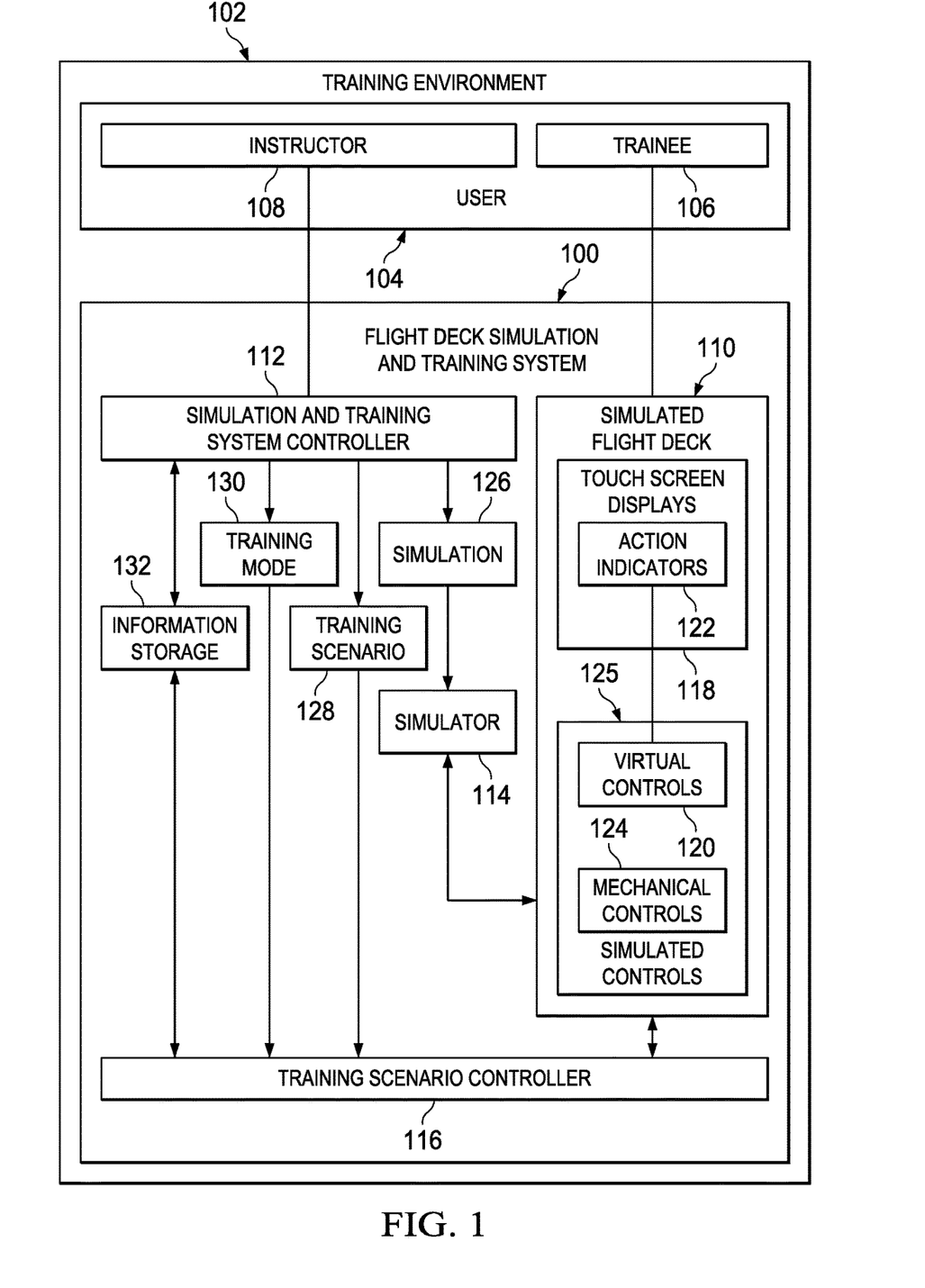
FIG. 1 is an illustration of a block diagram of a flight deck simulation and training system in accordance with an illustrative embodiment.

Turning to FIG. 1, an illustration of a block diagram of a flight deck simulation and training system is depicted in accordance with an illustrative embodiment. Flight deck simulation and training system 100 may be implemented in training environment 102. For example, without limitation, training environment 102 may comprise a classroom or any other appropriate location in which flight deck simulation and training system 100 may be implemented to perform the various functions described herein.

Flight deck simulation and training system 100 may be operated by user 104. For example, user 104 may comprise trainee 106, instructor 108, or both trainee 106 and instructor 108. For example, without limitation, trainee 106 may be a person who is learning to fly or otherwise operate an aircraft. Alternatively, or in addition, trainee 106 may be a technician who is learning the functioning of the aircraft.

Flight deck simulation and training system 100 may comprise simulated flight deck 110, simulation and training system controller 112, simulator 114, and training scenario controller 116.

Simulated flight deck 110 may include a plurality of touch screen displays 118. Touch screen displays 118 may be implemented using any appropriate touch screen display devices. Virtual controls 120 may be displayed on touch screen displays 118. Simulated flight deck 110 also may include mechanical controls 124. Virtual controls 120 and mechanical controls 124 may simulate virtual and mechanical controls on an aircraft. Therefore, virtual controls 120 and mechanical controls 124 may be referred to as simulated controls 125. Simulated aircraft displays also may be displayed on touch screen displays 118, on separate display devices on simulated flight deck 110, or both. Touch screen displays 118, mechanical controls 124, and any separate display devices may be arranged such that simulated flight deck 110 simulates a flight deck of an aircraft.

Simulated controls 125 may be operated by trainee 106 during a training session using flight deck simulation and training system 100. Action indicators 122 may be displayed on touch screen displays 118 along with virtual controls 120 to provide feedback to trainee 106 during a training session. Alternatively, or in addition, action indicators 122 may be displayed in association with mechanical controls 124 to provide feedback to trainee 106 during a training session.

Simulation and training system controller 112 may be configured to allow instructor 108 to select simulation 126, training scenario 128, and training mode 130 to be run for a particular training session. Simulator 114 may be configured to run simulation 126 of the operation of an aircraft in response to operation of virtual controls 120 and mechanical controls 124 by trainee 106 during the training session.

Training scenario controller 116 may be configured to control the display of action indicators 122 on touch screen displays 118 based on training scenario 128 and training mode 130 selected using simulation and training system controller 112. The display of action indicators 122 thus may have different purposes depending upon training mode 130. For example, in a guided training mode, action indicators 122 may indicate which of virtual controls 120 or mechanical controls 124 are the correct controls to be operated next by trainee 106 based on the selected training scenario 128. In the guided training mode, action indicators 122 also may be displayed to indicate virtual controls 120 or mechanical controls 124 that were incorrectly operated by trainee 106 based on the selected training scenario 128. In a practice training mode, action indicators 122 may indicate virtual controls 120 or mechanical controls 124 that were incorrectly operated by trainee 106 based on the selected training scenario 128.

Actions by trainee 106 with simulated controls 125 may be recorded during running of training scenario 128 to provide recorded user actions. Such recorded user actions may be stored in information storage 132 for analysis. For example, without limitation, recorded user actions may be retrieved from information storage 132 by simulation and training system controller 112 and compared with the actions to be performed by trainee 106 with simulated controls 125 as defined in training scenario 128 to generate a score.

The illustration of flight deck simulation and training system 100 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 2:
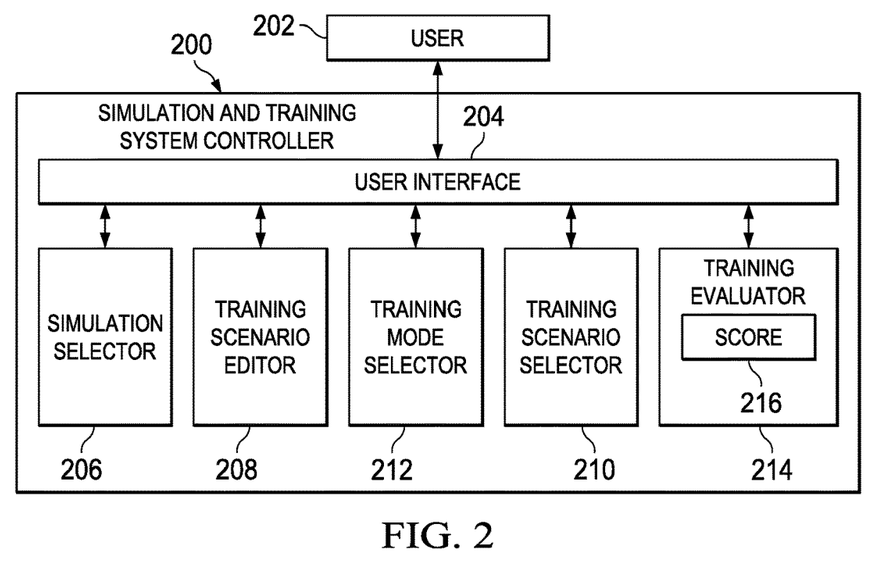
FIG. 2 is an illustration of a block diagram of a simulation and training system controller for a flight deck simulation and training system in accordance with an illustrative embodiment.

Turning to FIG. 2, an illustration of a block diagram of a simulation and training system controller for a flight deck simulation and training system is depicted in accordance with an illustrative embodiment. Simulation and training system controller 200 may be an example of one implementation of simulation and training system controller 112 in FIG. 1.

Simulation and training system controller 200 may be configured to allow user 202 to set up and initiate a training session and to evaluate the results of a training session. Simulation and training system controller 200 may comprise user interface 204, simulation selector 206, training scenario editor 208, training scenario selector 210, training mode selector 212, and training evaluator 214. User interface 204 may be implemented in any appropriate manner to allow user 202 to interact with and use simulation selector 206, training scenario editor 208, training scenario selector 210, training mode selector 212, and training evaluator 214.

Simulation selector 206 may be configured to allow user 202 to select a simulation to be run during a training session. Training scenario editor 208 may be configured to allow user 202 to create a training scenario or to change a training scenario that has already been created. Training scenario selector 210 may be configured to allow user 202 to select a training scenario to be used during a training session. Training mode selector 212 may be configured to allow user 202 to select a training mode to be used during a training session.

Training evaluator 214 may be configured to allow user 202 to evaluate the performance of a trainee while a training session is in progress or after a training session is complete. For example, without limitation, training evaluator 214 may be configured to generate score 216 based on the difference between user actions with simulated controls recorded during a training session and the user actions to be performed with the simulated controls as defined in the selected training scenario.

Figure 3:
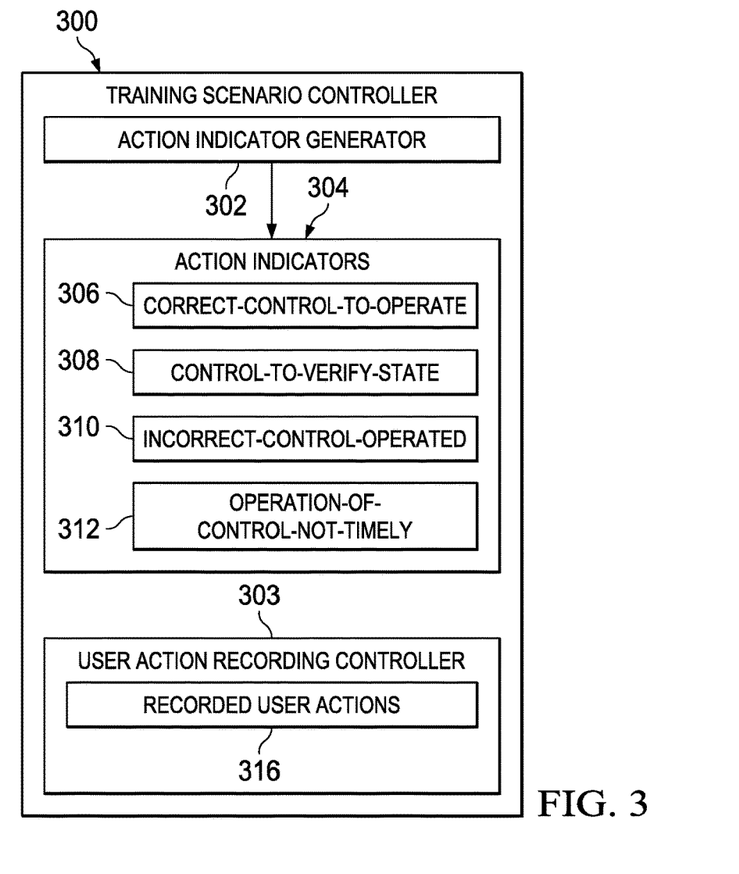
FIG. 3 is an illustration of a block diagram of a training scenario controller for a flight deck simulation and training system in accordance with an illustrative embodiment.

Turning to FIG. 3, an illustration of a block diagram of a training scenario controller for a flight deck simulation and training system is depicted in accordance with an illustrative embodiment. Training scenario controller 300 may be an example of one implementation of training scenario controller 116 in FIG. 1.

Training scenario controller 300 may comprise action indicator generator 302 and user action recording controller 303. Action indicator generator 302 may be configured to generate and display action indicators 304 based on a selected training scenario, a selected training mode, detected user actions with simulated controls, or any appropriate combination of selected training scenario, selected training mode, and detected user actions.

For example, without limitation, action indicators 304 generated by action indicator generator may include correct-control-to-operate 306 action indicator, control-to-verify-state 308 action indicator, incorrect-control-operated 310 action indicator, operation-of-control-not-timely 312 action indicator, or any other appropriate action indicator for providing feedback to a trainee during running of a training scenario. Correct-control-to-operate 306 action indicator may be configured to indicate a next correct simulated control for a user to operate based on the selected training scenario. Control-to-verify-state 308 action indicator may be configured to indicate a simulated control for which the state of the control is to be verified by a user in accordance with the training scenario. Incorrect-control-operated 310 action indicator may be configured to indicate an incorrect simulated control that has been operated by a user during the training scenario. Operation-of-control-not-timely 312 action indicator may indicate a control for which operation of a simulated control by a user is not timely in accordance with the training scenario.

User action recording controller 303 may be configured to record detected actions by a user with the simulated controls to provide recorded user actions 316. Recorded user actions 316 may be used by training evaluator 214 to generate score 214 as described above with reference to FIG. 2.

Figure 4:
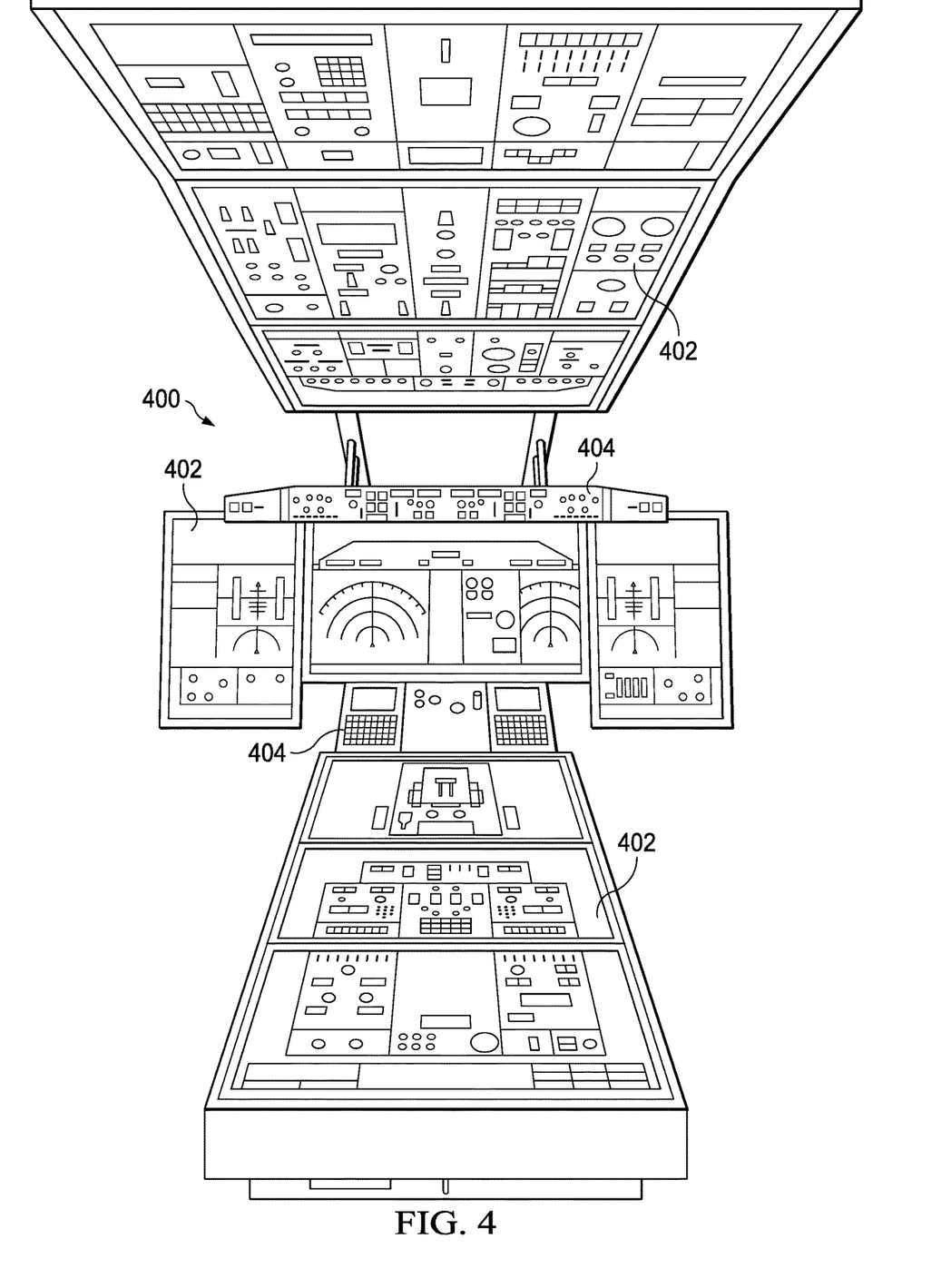
FIG. 4 is an illustration of a simulated flight deck for a flight deck simulation and training system in accordance with an illustrative embodiment.

Turning to FIG. 4, an illustration of a simulated flight deck for a flight deck simulation and training system is depicted in accordance with an illustrative embodiment. Simulated flight deck 400 may be an example of one implementation of simulated flight deck 110 in FIG. 1.

Simulated flight deck 400 comprises a plurality of flat panel touch screen displays 402 and mechanical controls 404 arranged to simulate a flight deck of an aircraft. Different numbers and arrangements of flat panel touch screen displays 402 and mechanical controls 404 may be used to simulate flight decks for different aircraft in other illustrative embodiments.

Figure 5:
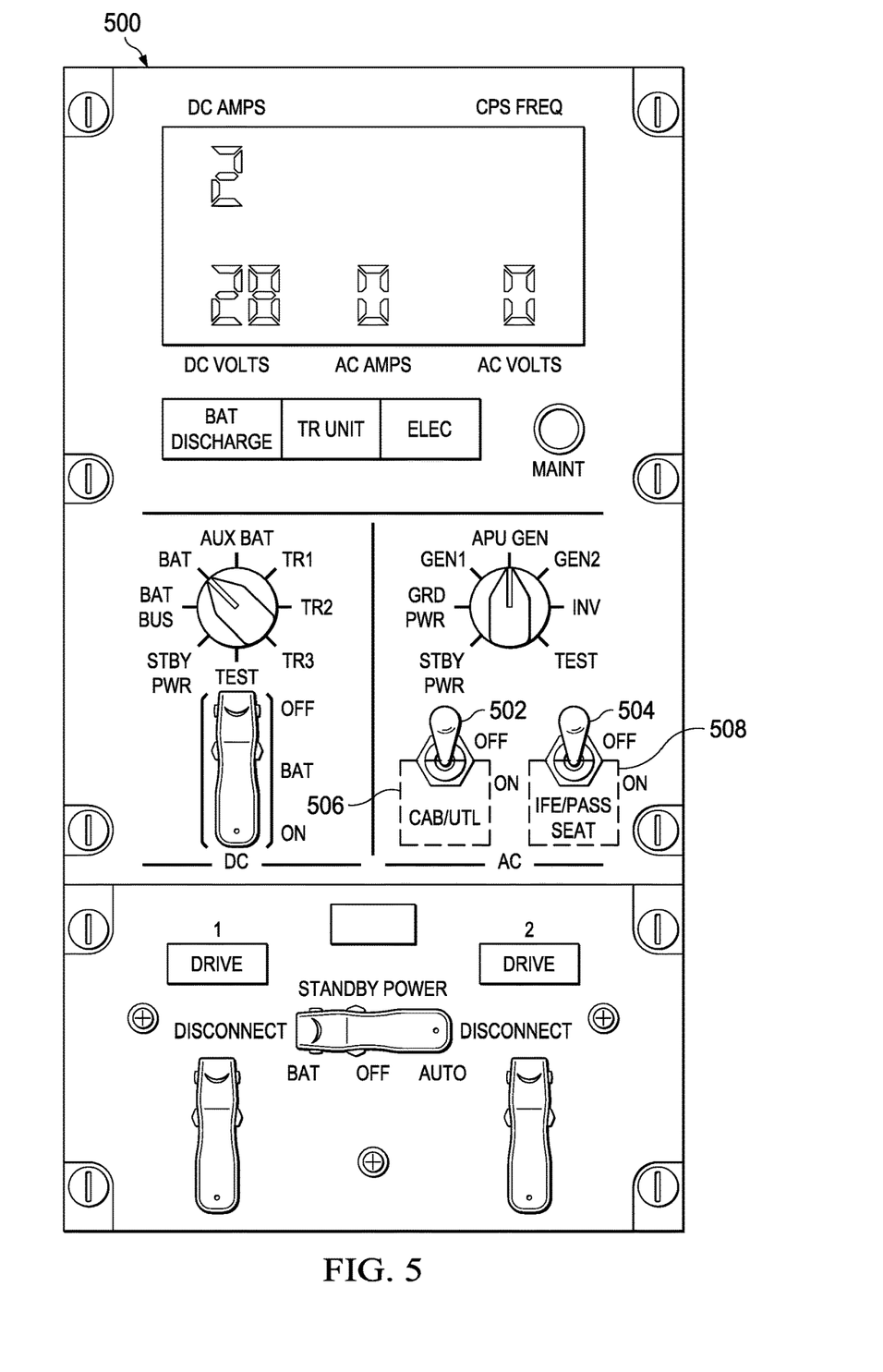
FIG. 5 is an illustration of virtual controls and action indicators displayed on a display device of a flight deck simulation and training system in accordance with an illustrative embodiment.

Turning to FIG. 5, an illustration of virtual controls and action indicators displayed on a display device of a flight deck simulation and training system is depicted in accordance with an illustrative embodiment. Display 500 is an example of a portion of a display presented on one of touch screen displays 118 in flight deck simulation and training system 100 in FIG. 1 or on one of flat panel touch screen displays 402 in FIG. 4.

Display 500 includes virtual control 502 and virtual control 504 in the form of virtual switches. Action indicator 506 is displayed in association with virtual control 502 and action indicator 508 is displayed in association with virtual control 504. Action indicators 506 and 508 may include, for example, without limitation, color shading or any other appropriate indicator for drawing attention to virtual controls 502 and 504, respectively.

The display of action indicators 506 and 508 may have different purposes depending upon the training mode or detected actions by a trainee user with virtual control 502 and virtual control 504. For example, in a guided training mode, action indicators 506 and 508 may indicate that virtual controls 502 and 504 are the correct controls to be operated next based on the selected training scenario. In a guided training mode or a practice training mode, action indicators 506 and 508 may indicate that virtual controls 502 and 504 were incorrectly operated based on the selected training scenario.

Figure 6:
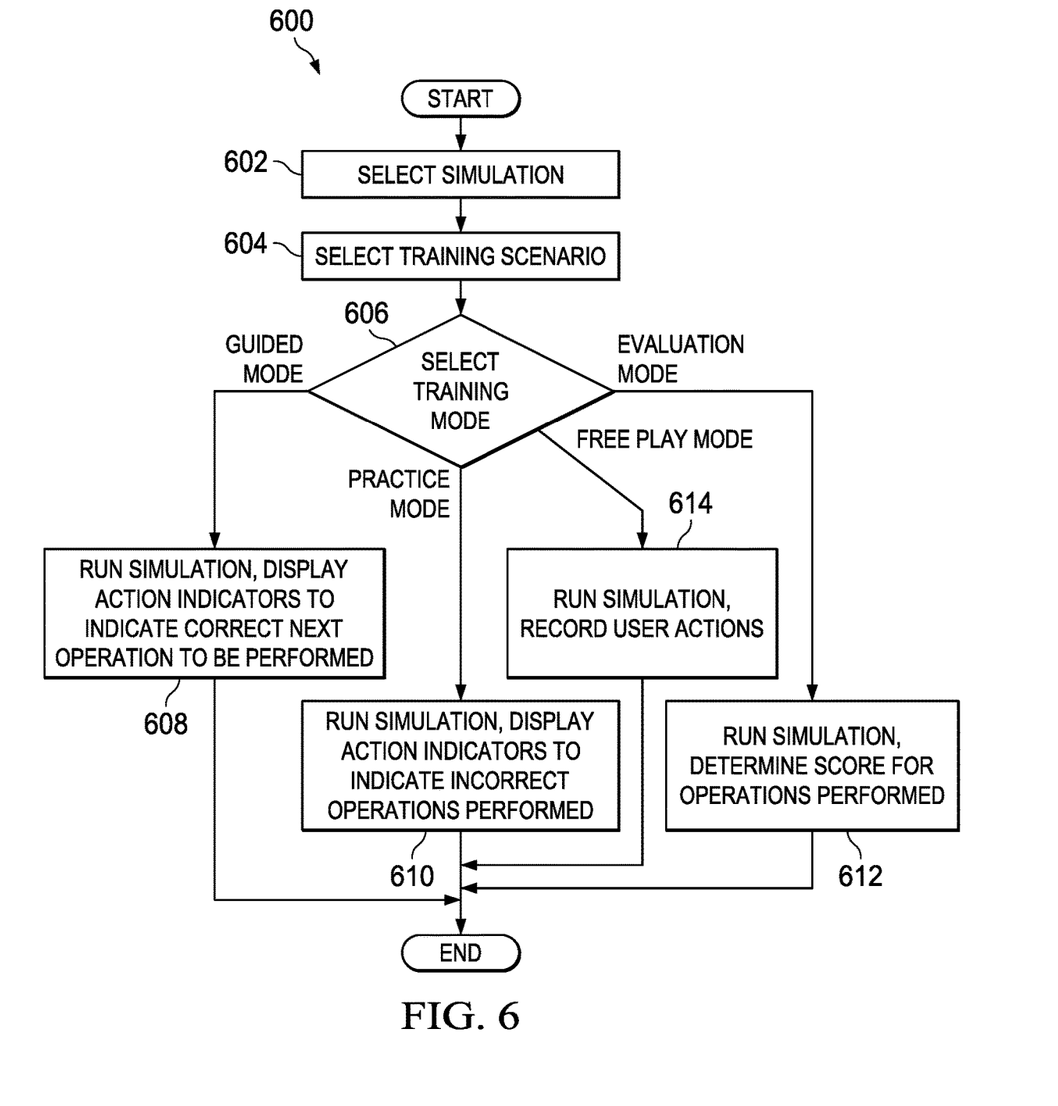
FIG. 6 is an illustration of a flowchart of a training process using a flight deck simulation and training system in accordance with an illustrative embodiment.

Turning to FIG. 6, a flowchart of a process for training a user to operate an aircraft using a flight deck simulation and training system is depicted in accordance with an illustrative embodiment. Process 600 is an example of a process that may be implemented in flight deck simulation and training system 100 in FIG. 1.

Process 600 may begin with selecting a simulation (operation 602), a training scenario (operation 604), and a training mode (operation 606) for a training session. In response to selecting a guided mode at operation 606, the simulation may be run and action indicators may be displayed to indicate the correct simulated control to be operated by a trainee user (operation 608), with the process terminating thereafter. Action indicators also may be displayed in guided mode to indicate an incorrect simulated control that was operated by the trainee user based on the selected training scenario. In response to selecting a practice mode at operation 606, the simulation may run and action indicators may be displayed to indicate incorrect operations performed by a trainee based on the selected training scenario (operation 610), with the process terminating thereafter. In response to selecting an evaluation mode at operation 606, the simulation may be run and data gathered to generate a score for the operations performed by the trainee based on the selected training scenario (operation 612), with the process terminating thereafter. In response to selecting a free play mode at operation 606, the simulation may be run and user actions with the simulated controls recorded based on the selected training scenario (operation 614), with the process terminating thereafter.

Figure 7:
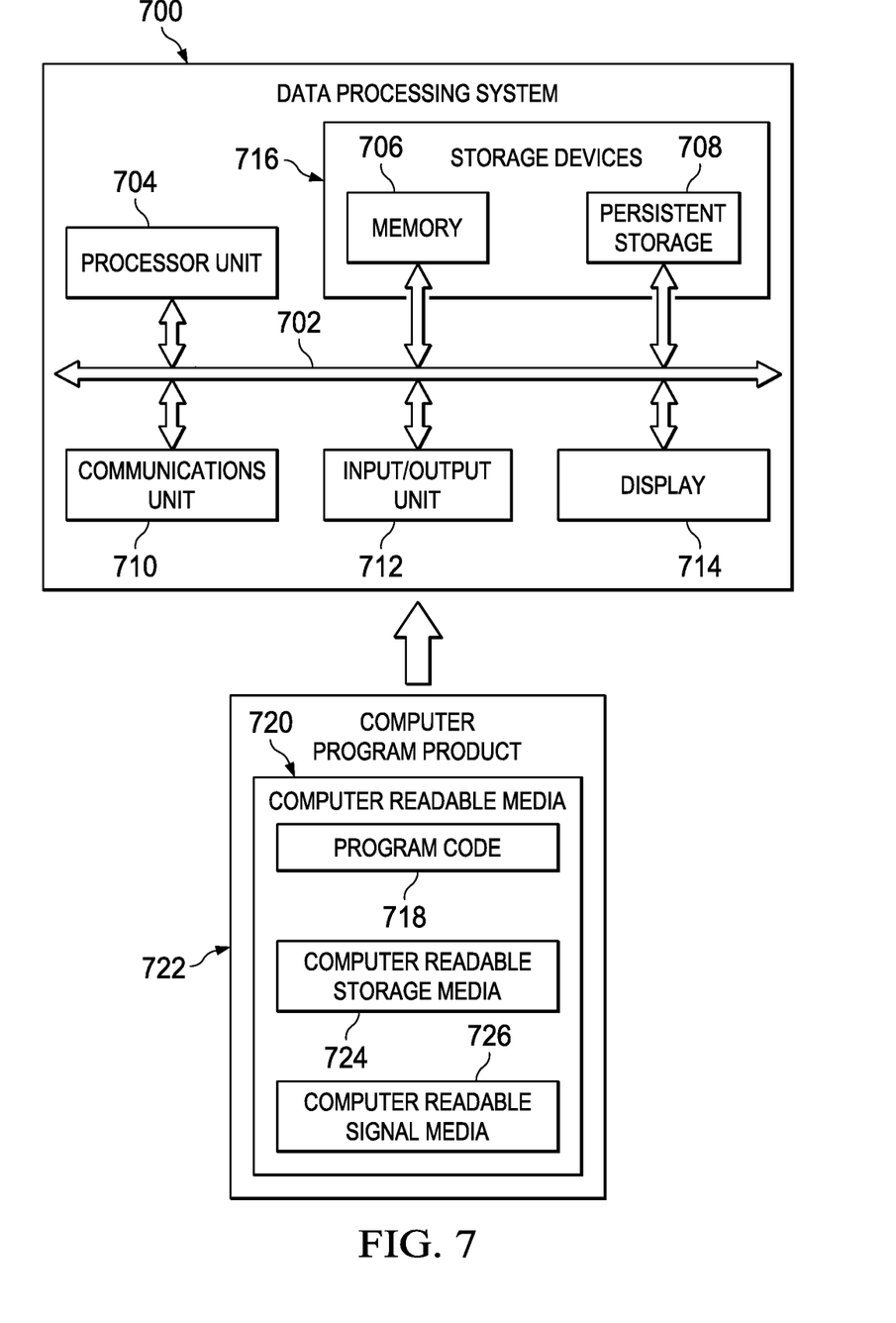
FIG. 7 is an illustration of a block diagram of a data processing system in accordance with an illustrative embodiment.

Turning now to FIG. 7, an illustration of a block diagram of a data processing system is depicted in accordance with an illustrative embodiment. In this example, data processing system 700 is an example of one implementation of a data processing system for implementing flight deck simulation and training system 100 in FIG. 1.

In this illustrative example, data processing system 700 includes communications fabric 702. Communications fabric 702 provides communications between processor unit 704, memory 706, persistent storage 708, communications unit 710, input/output (I/O) unit 712, and display 714. Memory 706, persistent storage 708, communications unit 710, input/output (I/O) unit 712, and display 714 are examples of resources accessible by processor unit 704 via communications fabric 702.

Processor unit 704 serves to run instructions for software that may be loaded into memory 706. Processor unit 704 may be a number of processors, a multi-processor core, or some other type of processor, depending on the particular implementation. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and other suitable information either on a temporary basis or a permanent basis. Storage devices 716 also may be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output (I/O) unit 712 allows for input and output of data with other devices that may be connected to data processing system 700. For example, input/output (I/O) unit 712 may provide a connection for user input through a keyboard, a mouse, and/or some other suitable input device. Further, input/output (I/O) unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program instructions, program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700.

In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, data processing system 700 may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or both transmit and receive data. Communications unit 710 may be, for example, a modem or a network adapter, two network adapters, or some combination thereof. Further, a memory may be, for example, memory 706, or a cache, such as that found in an interface and memory controller hub that may be present in communications fabric 702.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved. Furthermore, in some alternative implementations, the functions associated with some blocks in the flowcharts and block diagrams may be eliminated.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to: (1) best explain the principles of the embodiments and the practical application of such principles, and (2) enable others of ordinary skill in the art to understand the disclosure for various embodiments with various modifications as may be suited to various uses and applications.

What is claimed is:

1. A method, of training operating an aircraft, comprising:
providing simulated controls for the aircraft;
associating the simulated controls for the aircraft with a training system controller comprising: a simulation selector, a scenario editor configured to create or change a scenario, a mode selector, a scenario selector, and an evaluator;
associating the training system controller with a training scenario controller comprising an action indicator generator configured to generate an action indicator depending upon a combination of: a scenario selection, a mode selection, and an input received for an action associated with a simulated control in the simulated controls;
receiving in the scenario selector, a scenario selection;
receiving in the mode selector, a mode selection;
determining, in the action indicator generator using the scenario selection, the mode selection, and the input received for the action associated the simulated control, and displaying a particular action indicator for the simulated control, the particular action indicator comprising an indication for an operation-of-control-not-timely; and
simulating operation of the aircraft based on the input received for the action associated with the simulated control.

2. The method of claim 1, wherein:
providing the simulated controls for the aircraft comprises displaying virtual controls for the aircraft on a plurality of touch screen displays in a simulated flight deck; and
displaying the particular action indicator comprises displaying the action indicator associated with at least one of the virtual controls on a least one of the plurality of touch screen displays.

3. The method of claim 1, further comprising providing mechanical controls in a simulated flight deck; and
displaying the action indicator associated with at least one of the mechanical controls.

4. The method of claim 1, wherein displaying the action indicator comprises displaying the action indicator prompting a correct-control for receiving a next action.

5. The method of claim 1, wherein displaying the action indicator comprises displaying the action indicator for verifying a state of the simulated controls for the aircraft.

6. The method of claim 1, wherein displaying the action indicator comprises displaying the action indicator indicating an incorrect input received for the action associated with the simulated control.

7. The method of claim 1 further comprising:
recording the input received for the action associated with the simulated control; and
comparing a recorded input received for the action associated with the simulated control as defined in the scenario selected, and generating a score for the input received for action associated with the simulated control.

8. An apparatus, that comprises:
a simulated flight deck that comprises: simulated controls for an aircraft;
a training system controller that comprises: a simulation selector, a scenario editor configured to create or change a scenario, a mode selector, a scenario selector, and an evaluator, and associated with a training scenario controller that comprises an action indication generator configured to generate an action indicator based upon a combination of: a scenario selection, a mode selection, and an input received for an action associated with a simulated control in the simulated controls such that the scenario selection defines desired actions associated with the simulated controls; and
a simulator configured to:
simulate operation of the aircraft based on actions associated with the simulated controls; and
recognize, and present the action indicator for, an operation-of-control-not-timely.

9. The apparatus of claim 8, wherein:
the simulated controls for the aircraft comprise virtual controls for the aircraft displayed on a plurality of touch screen displays in the simulated flight deck; and the training scenario controller is configured to display the action indicator associated with at least one of the virtual controls on a least one of the plurality of touch screen displays.

10. The apparatus of claim 8, wherein:
the simulated controls for the aircraft comprise mechanical controls in the simulated flight deck; and
the training scenario controller is configured to display the action indicator associated with at least one of the mechanical controls.

11. The apparatus of claim 8, further comprising the training scenario controller configured to display the action indicator to indicate a correct input received for the action associated with the simulated control based on the scenario selection.

12. The apparatus of claim 8, further comprising the training scenario controller configured to display the action indicator to indicate at least one of the simulated controls having a state that requires verification based on the scenario selection.

13. The apparatus of claim 8, wherein the training scenario controller is configured to display the action indicator to indicate an incorrect input received for an action associated with one of the simulated controls based on the scenario selection.

14. The apparatus of claim 8 further comprising:
a user action recording controller configured to record the input received for the action associated with the simulated control; and
a training evaluator configured to generate a score based upon a comparison of the input received for the action associated with the simulated control with actions defined in the scenario selection.

15. A method, of training operating an aircraft, comprising:
providing simulated controls for the aircraft;
associating the simulated controls for the aircraft with a training system controller comprising: a simulation selector, a scenario editor configured to create or change a scenario, a mode selector, a scenario selector, and an evaluator;
associating the training system controller with a training scenario controller comprising an action indicator generator configured to generate an action indicator depending upon a combination of: a selection of a training scenario, a selection of a training mode, and an input received for an action associated with a simulated control in the simulated controls;
selecting a training scenario defining actions to be performed with the simulated controls;
selecting a training mode from a plurality of training modes comprising: a guided mode, a practice mode, and an evaluation mode;
in response to selecting the guided mode or the practice mode, recognizing, and displaying the action indicator for, an operation-of-control-not-timely; and
in response to selecting the evaluation mode, displaying a score based upon the training scenario.

16. The method of claim 15, further comprising:
providing the simulated controls for the aircraft comprises displaying virtual controls for the aircraft on a plurality of touch screen displays in a simulated flight deck and providing mechanical controls in the simulated flight deck; and
displaying a correct-control-to-operate action indicator or an incorrect-control-operated action indicator associated with at least one of the virtual controls on a least one of the plurality of touch screen displays or associated with at least one of the mechanical controls.

17. The method of claim 15, further comprising:
displaying a correct-control-to-operate action indicator in a first color; and
displaying an incorrect-control-operated action indicator in a second color that is different from the first color.

18. The method of claim 15 further comprising, in response to selecting the guided mode, displaying an incorrect-control-operated action indicator to indicate an incorrect one of the simulated controls operated based on the training scenario.

19. The method of claim 15 further comprising:
selecting a simulation of the aircraft; and
running the simulation of the aircraft to simulate operation of the aircraft based on actions with the simulated controls.

20. The method of claim 15 further comprising:
recording actions with the simulated controls to provide recorded user actions; and
generating the score via comparing the recorded user actions with actions to be performed with the simulated controls as defined in the training scenario.

* * * * *